US012522005B2

(12) United States Patent
Takagiwa

(10) Patent No.: US 12,522,005 B2
(45) Date of Patent: Jan. 13, 2026

(54) PLATEN AND PRINTING DEVICE

(71) Applicant: BROTHER KOGYO KABUSHIKI KAISHA, Nagoya (JP)

(72) Inventor: Yutaka Takagiwa, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 54 days.

(21) Appl. No.: 18/233,960

(22) Filed: Aug. 15, 2023

(65) Prior Publication Data

US 2023/0382137 A1 Nov. 30, 2023

Related U.S. Application Data

(63) Continuation of application No. PCT/JP2022/003263, filed on Jan. 28, 2022.

(30) Foreign Application Priority Data

Feb. 15, 2021 (JP) ................................ 2021-022106

(51) Int. Cl.

*B41J 11/06* (2006.01)
*B41J 2/21* (2006.01)
*B41J 3/407* (2006.01)

(52) U.S. Cl.

CPC ................ *B41J 11/06* (2013.01); *B41J 2/21* (2013.01); *B41J 3/4078* (2013.01)

(58) Field of Classification Search

CPC ........ B41J 11/06; B41J 11/007; B41J 3/4078; B41J 3/407; B41J 13/24; B41J 29/13; B41F 15/0863; B41F 27/005; B41F 27/08; B65H 11/00; D05C 9/04

See application file for complete search history.

(56) References Cited

U.S. PATENT DOCUMENTS 7,681,510 B2 * 3/2010 Watanabe ............. D05B 39/00 38/102.91
7,854,200 B2 12/2010 Livingston
2002/0154202 A1 10/2002 Yamamoto et al.
2004/0189776 A1 * 9/2004 Niimi ....................... B41J 11/06 347/104
2007/0195119 A1 8/2007 Niimi
2008/0079958 A1 4/2008 Niimi
2015/0151551 A1 6/2015 Livingston (Continued)

FOREIGN PATENT DOCUMENTS

CN 206154921 U 5/2017
CN 107428160 A 12/2017

(Continued)

OTHER PUBLICATIONS

International Search Report of corresponding PCT application PCT/JP2022/003263, dated Mar. 1, 2022.

(Continued)

*Primary Examiner* — John P Zimmermann

(74) *Attorney, Agent, or Firm* — K&L Gates LLP

(57) ABSTRACT

A platen for a printing device supports a cloth onto which ink is to be ejected from an ink jet head of the printing device. The platen has a plurality of protrusion portions each protruding upward from an upper surface of the platen. Tip ends of the protrusion portions each have a shape for hooking fluff or fibers of the cloth.

5 Claims, 15 Drawing Sheets

(56) References Cited

U.S. PATENT DOCUMENTS

| | | | | |
|---|---|---|---|---|
| 2017/0246886 | A1 | 8/2017 | Sasaki | |
| 2017/0253054 | A1 | 9/2017 | Hamada | |
| 2017/0320339 | A1* | 11/2017 | Matsumoto | B41J 11/06 |
| 2018/0093503 | A1 | 4/2018 | Togashi et al. | |
| 2018/0244080 | A1 | 8/2018 | Hamada | |
| 2018/0326757 | A1 | 11/2018 | Bouwens et al. | |
| 2019/0105929 | A1* | 4/2019 | Hamada | B41J 29/13 |
| 2019/0255865 | A1 | 8/2019 | Turner | |
| 2019/0299663 | A1 | 10/2019 | Takagiwa | |

FOREIGN PATENT DOCUMENTS

| | | | |
|---|---|---|---|
| JP | 2002370416 | A | 12/2002 |
| JP | 2008080750 | A | 4/2008 |
| JP | 2016147453 | A | 8/2016 |
| JP | 2017065022 | A | 4/2017 |
| JP | 2017148970 | A | 8/2017 |
| JP | 2017159472 | A | 9/2017 |
| JP | 2018138362 | A | 9/2018 |
| JP | 2019178008 | A | 10/2019 |
| WO | 2016117414 | A1 | 7/2016 |

OTHER PUBLICATIONS

International Preliminary Report on Patentability for corresponding PCT application PCT/JP2022/003263, dated Aug. 15, 2023.

Written Opinion for corresponding PCT application PCT/JP2020/048398, dated Mar. 1, 2022. (4 pages.).

Written Opinion for corresponding PCT application PCT/JP2022/003263, dated Mar. 1, 2022. (4 pages.).

Office Action issued in corresponding Japanese patent application No. 2021-022106, dated Feb. 13, 2024. (2 pages.).

Office Action issued in corresponding Japanese patent application No. 2021-022106, dated Jul. 2, 2024. (2 pages.).

* cited by examiner

PLATEN AND PRINTING DEVICE

REFERENCE TO RELATED APPLICATIONS

This is a continuation application of International Application No. PCT/JP2022/003263 filed on Jan. 28, 2022 which claims priority from Japanese Patent Application No. 2021-022106 filed on Feb. 15, 2021. The entire contents of the earlier applications are incorporated herein by reference.

BACKGROUND ART

The present disclosure relates to a platen and a printing device.

A printing device described in JP2018-138362A includes a medium support unit that supports a medium such as cloth from below, and a print head that ejects ink onto the medium to perform printing.

In the printing device described above, depending on a type of the cloth, the cloth may shrink when the ink is adhered to the cloth. As a result, there is a possibility that a position on the cloth at which the subsequently ejected ink adheres deviates from a desired position on the cloth.

DESCRIPTION

An object of the present disclosure is to provide a platen and a printing device capable of reducing a possibility that a position on a cloth at which ejected ink adheres deviates from a desired position on the cloth.

According to a first aspect of the present disclosure, a platen that supports a cloth onto which ink is to be ejected from an ink jet head includes a plurality of protrusion portions each protruding upward from an upper surface of the platen, in which tip ends of the protrusion portions each have a shape for hooking fluff or fibers of the cloth.

In the platen of the first aspect, since the tip ends of the protrusion portions hook the fluff or fibers of the cloth, an amount of shrinkage of the cloth due to the ink adhesion is reduced. Accordingly, a possibility that a position on the cloth at which the ejected ink adheres deviates from a desired position on the cloth can be reduced.

The platen may extend in a first direction orthogonal to an upper-lower direction and in a second direction orthogonal to the upper-lower direction and the first direction, and the plurality of protrusion portions may protrude upward from the upper surface of the platen, and toward an outside of the platen in the first direction and the second direction.

In this case, the platen can reduce, by the protrusion portions, an amount of shrinkage of the cloth which tends to shrink toward an inside of the platen.

The plurality of protrusion portions may protrude toward, as the outside, a removal direction in which the cloth is removed from the platen.

When a user removes the cloth from the platen in the removal direction, since the protrusion portions protrude upward and in the removal direction, hooking between the cloth to be removed and the protrusion portions is reduced.

The platen may support clothing as the cloth, a positioning portion configured to position a collar of the clothing may be provided at one end portion of the platen in the first direction, and the plurality of protrusion portions each may protrude upward and toward the one end portion.

When a user removes the clothing from the platen toward the one end portion, since the protrusion portions protrude upward and toward the one end portion, hooking between the clothing to be removed and the protrusion portions is reduced.

The plurality of protrusion portions may be provided on an entire of the upper surface.

In this case, an amount of shrinkage of the cloth due to the ink adhesion can be reduced as compared with a case where the protrusion portions are provided on a part of the upper surface of the platen.

A printing device according to a second aspect of the present disclosure includes: an ink jet head configured to eject ink onto a cloth; and a platen configured to support the cloth, in which the platen includes a plurality of protrusion portions each protruding upward from an upper surface of the platen, and tip ends of the protrusion portions each have a shape for hooking fluff or fibers of the cloth.

The printing device of the second aspect can achieve the same effects as those of the first aspect.

The ink jet head may include a base ink jet head configured to eject base ink, and a color ink jet head configured to eject color ink onto the base ink which is adhered onto the cloth.

In the printing device, since an amount of shrinkage of the cloth due to the base ink adhesion is reduced, a possibility that a position on the cloth at which the ejected color ink adheres deviates from a position on the cloth at which the base ink adheres can be reduced.

Figure 5:
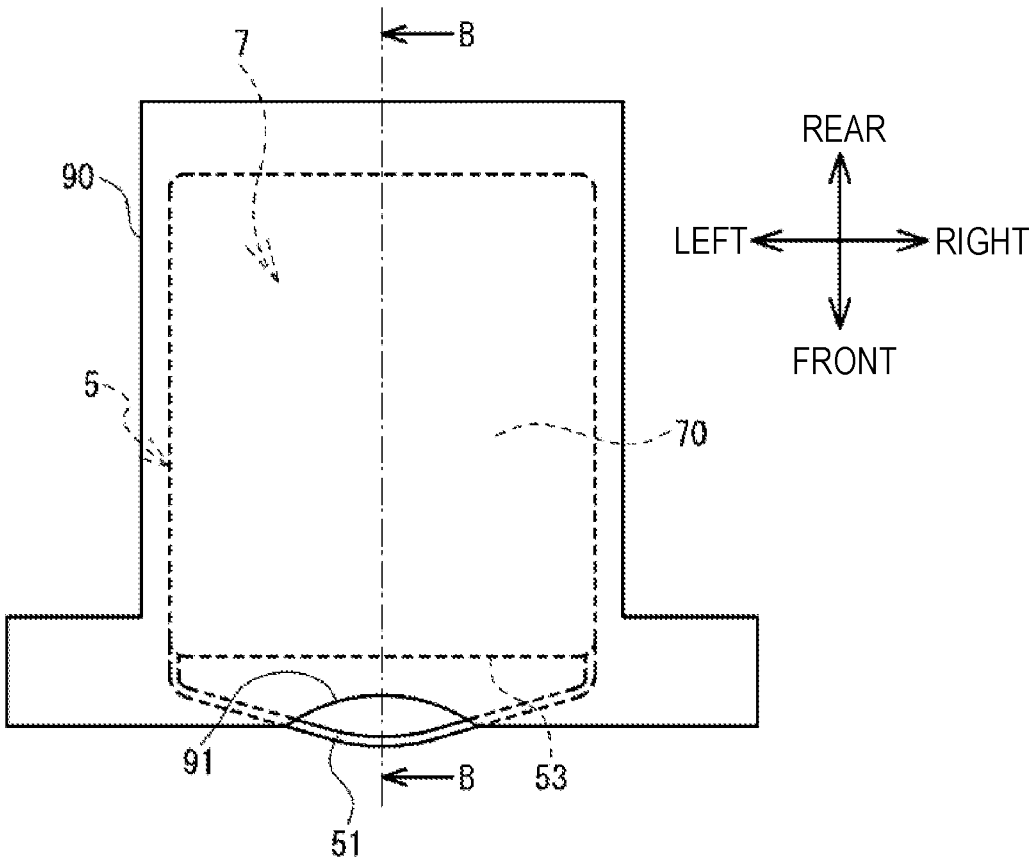
FIG. 5 is a plan view of the platen 5 on which a T-shirt 90 is positioned.
Figure 8:
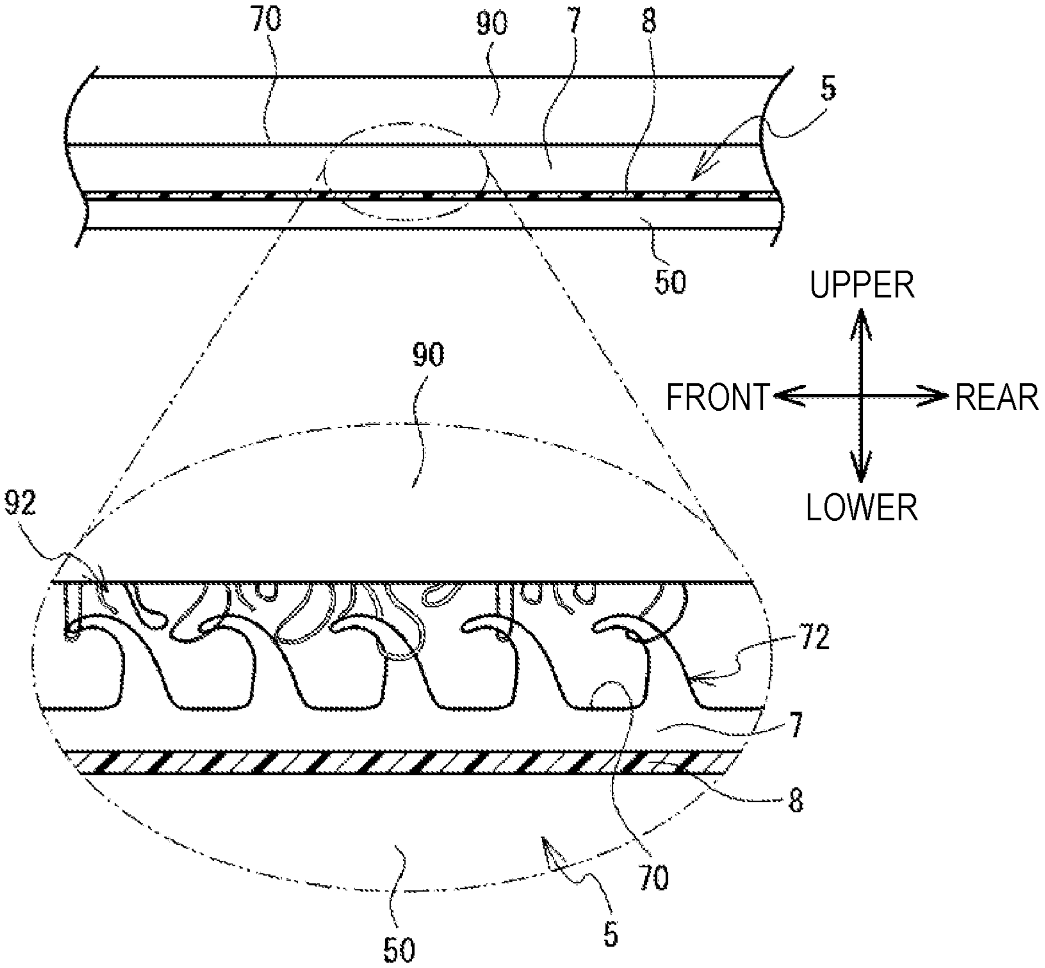

FIG. 8 is a cross-sectional view of the platen 5 and the T-shirt 90 shown in FIG. 5, taken along the line B-B, in a case where protrusion portions 72 are provided.

Figure 9:
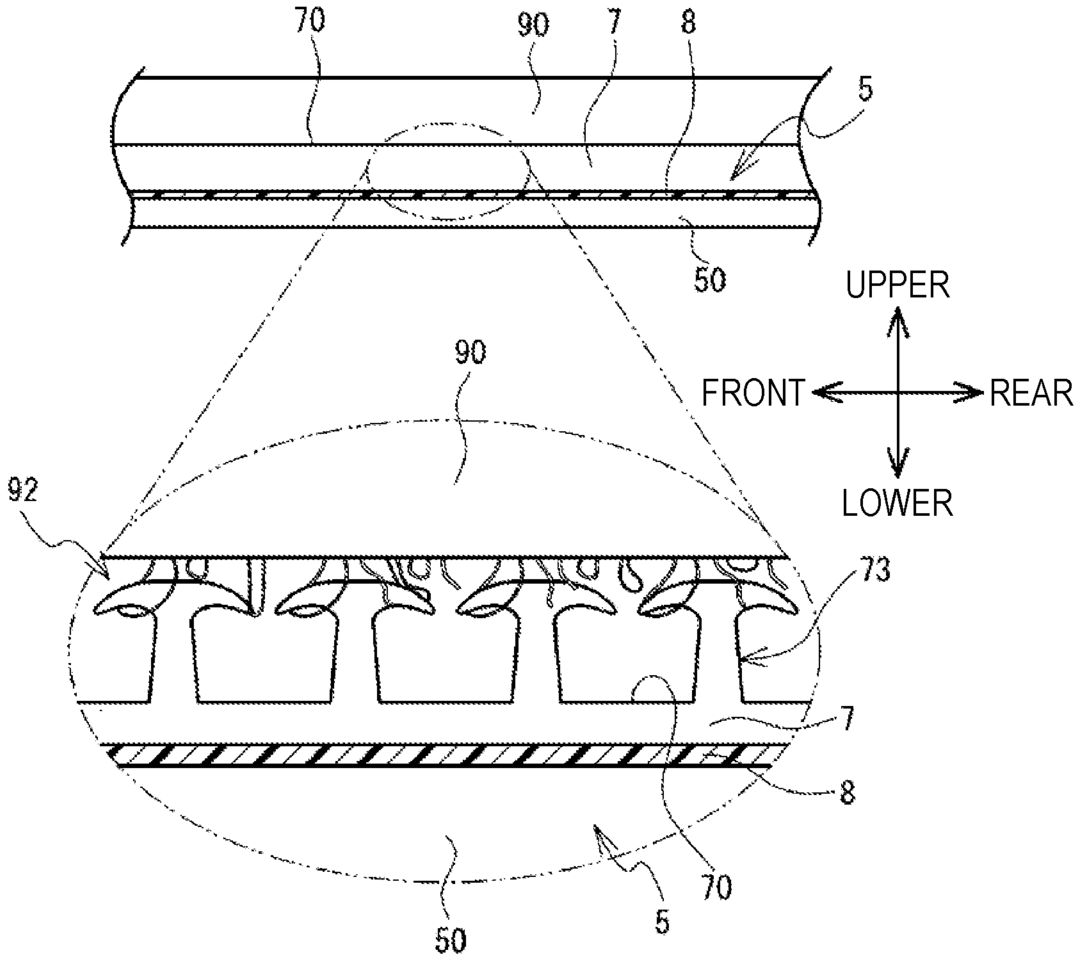

FIG. 9 is a cross-sectional view of the platen 5 and the T-shirt 90 shown in FIG. 5, taken along the line B-B, in a case where protrusion portions 73 are provided.

Figure 10:
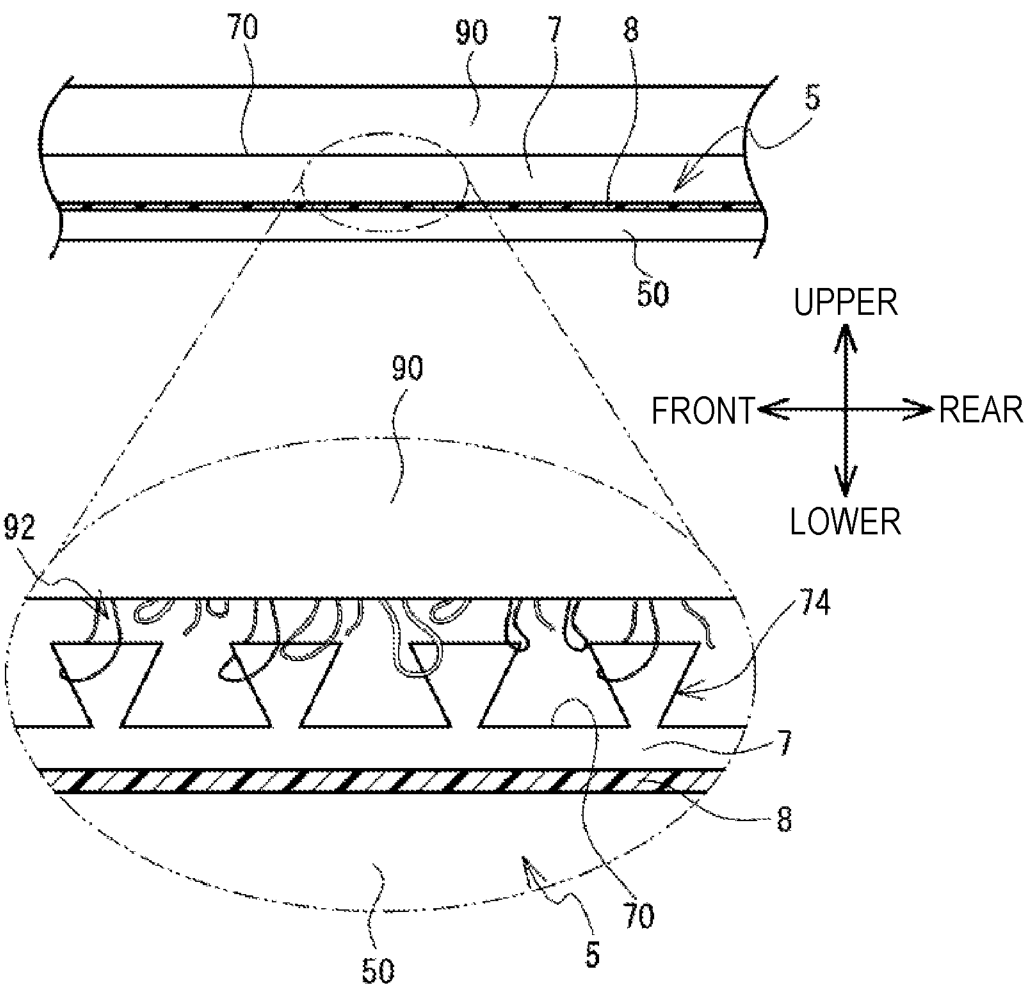

FIG. 10 is a cross-sectional view of the platen 5 and the T-shirt 90 shown in FIG. 5, taken along the line B-B, in a case where protrusion portions 74 are provided.

Figure 11:
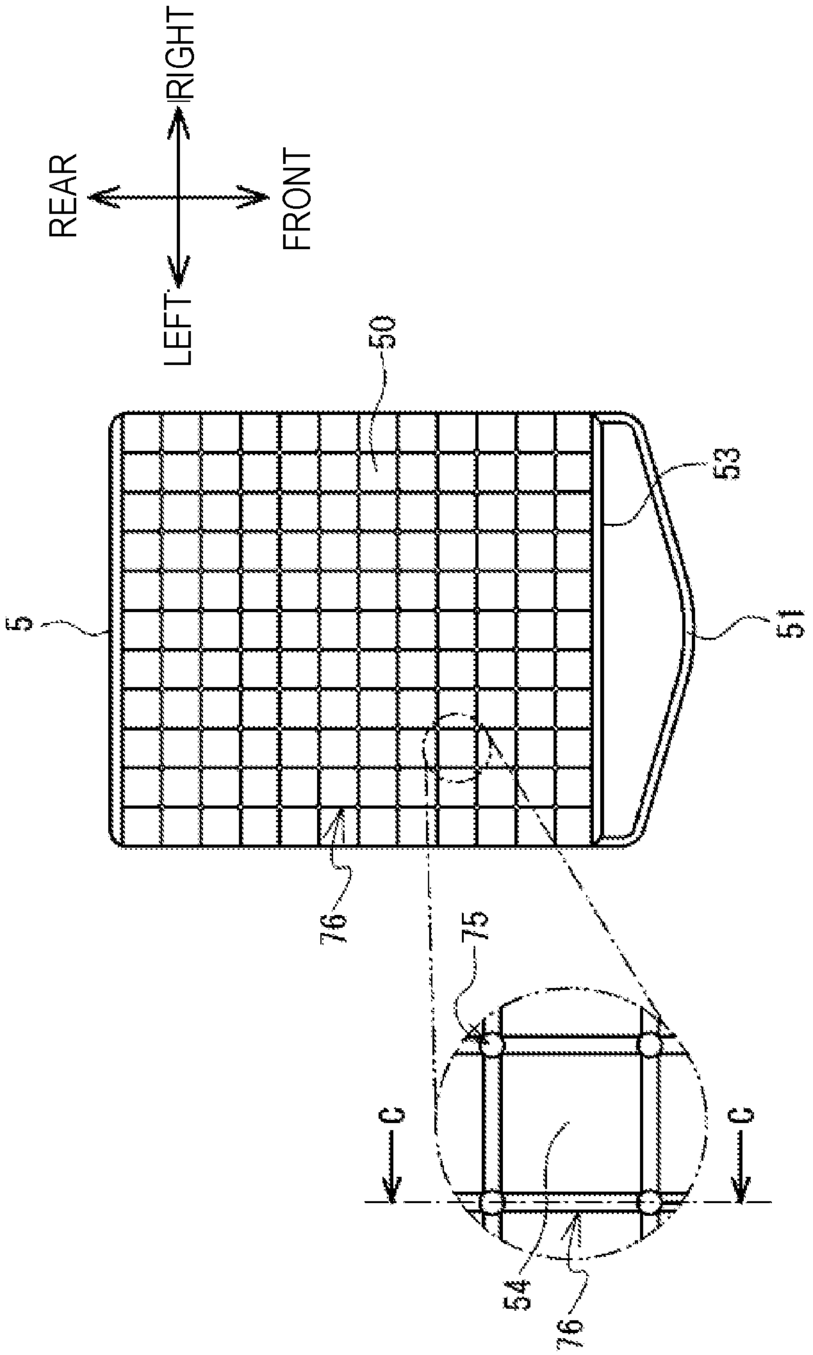

FIG. 11 is a plan view of the platen 5 provided with protrusion portions 75.

Figure 12:
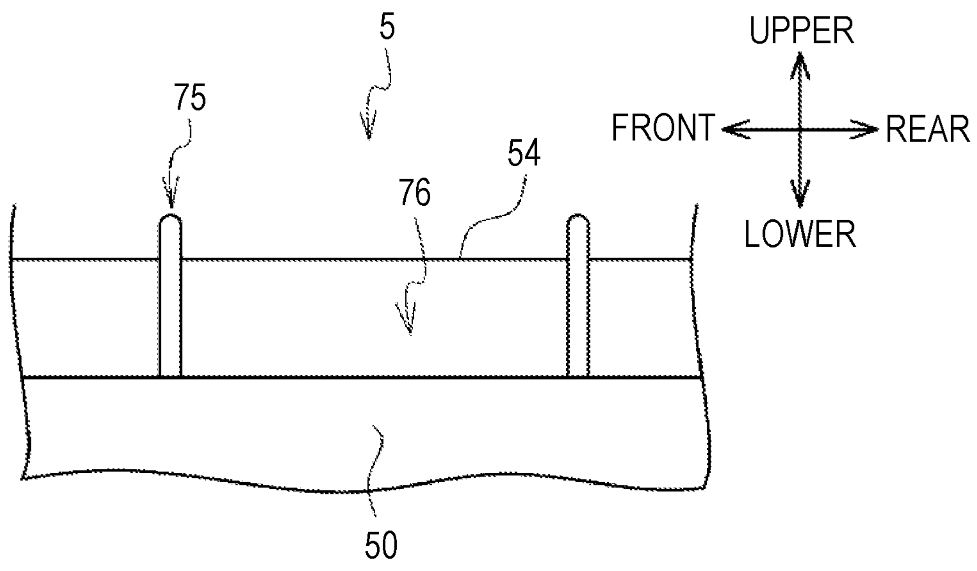

FIG. 12 is a cross-sectional view of the platen 5 shown in FIG. 11 taken along a line C-C.

Figure 13:
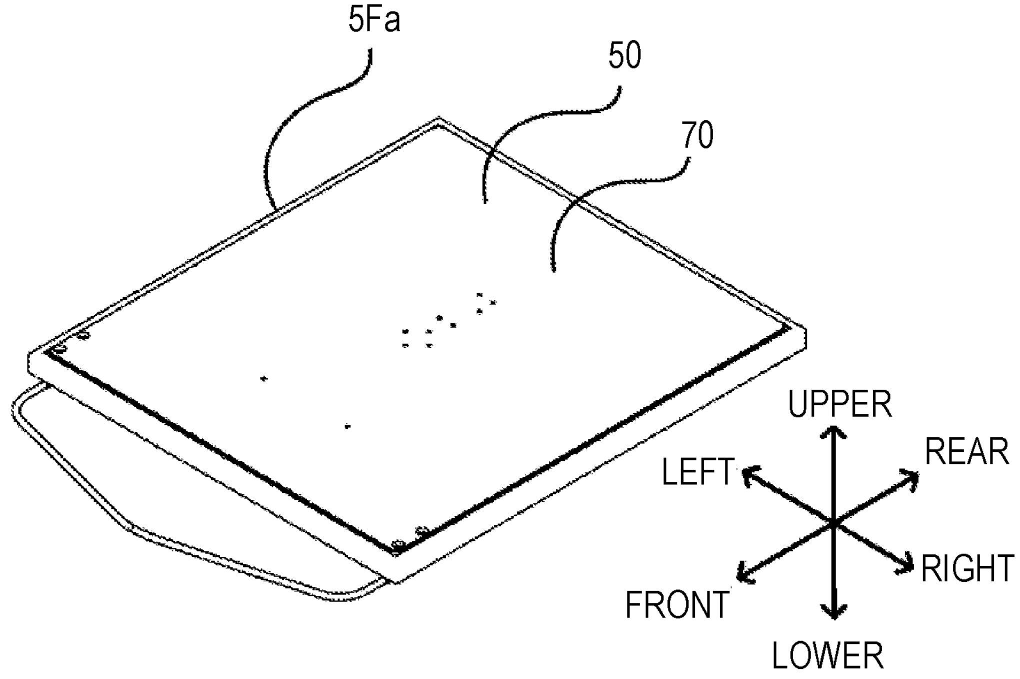

FIG. 13 is a perspective view of the platen 5 in a case where a frame 5Fa is provided, as viewed from a front upper right side.

Figure 14:
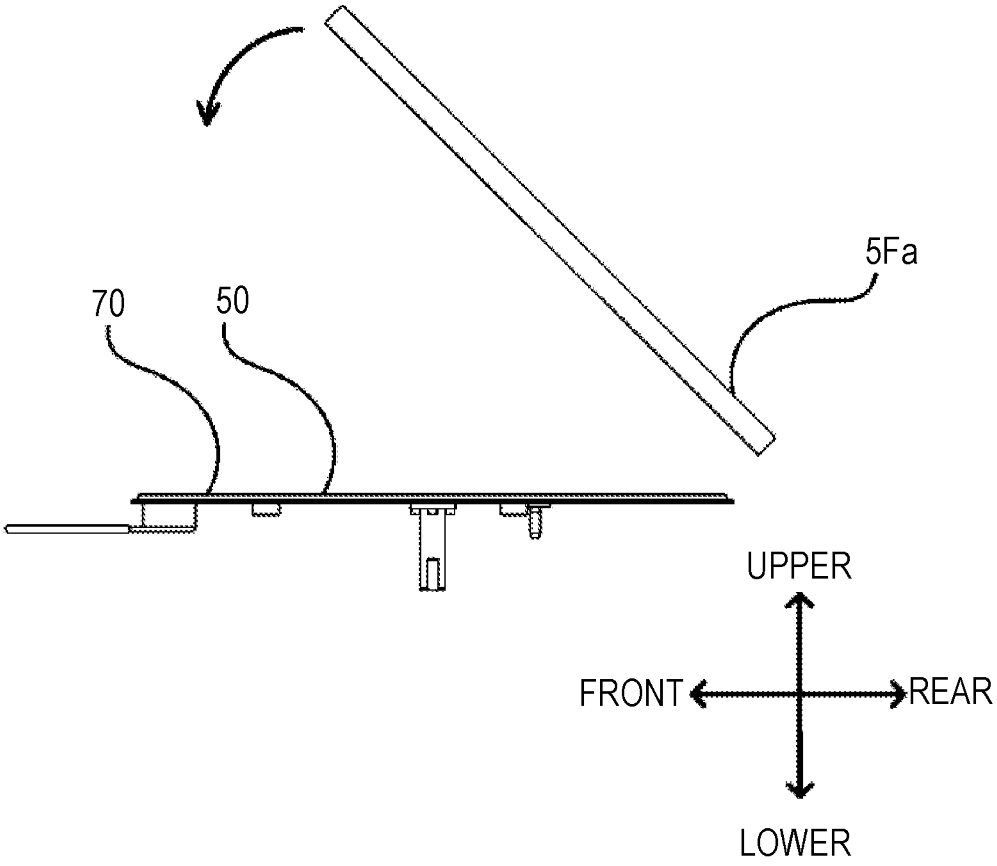

FIG. 14 is a view of the platen 5 as viewed from a right side when the frame 5Fa is provided.

Figure 15:
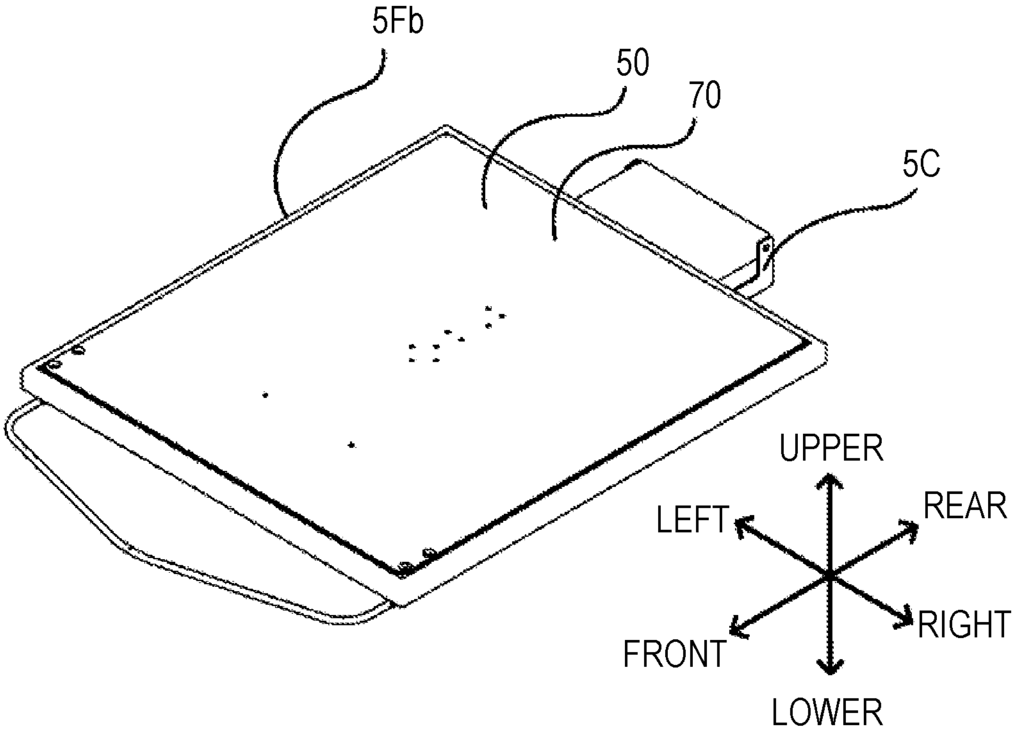

FIG. 15 is a perspective view of the platen 5 in a case where a frame 5Fb is provided, as viewed from a front upper right side.

Figure 16:
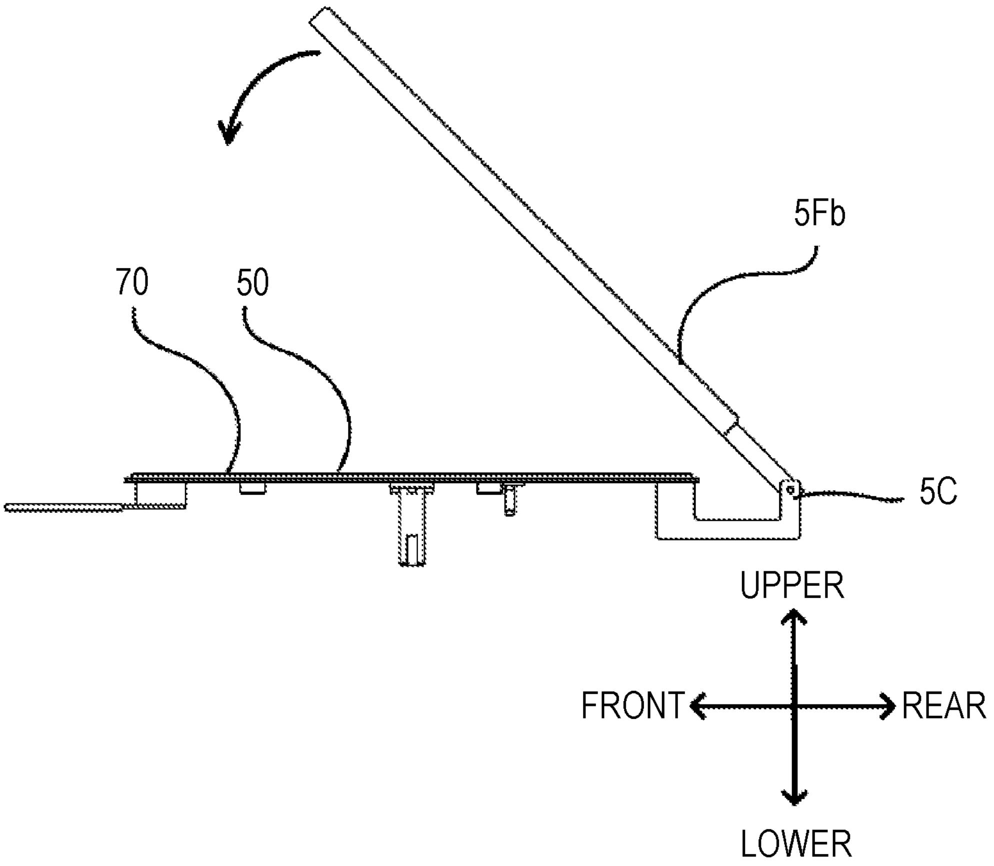

FIG. 16 is a view of the platen 5 as viewed from a right side in a case where the frame 5Fb is provided.

Figure 1:
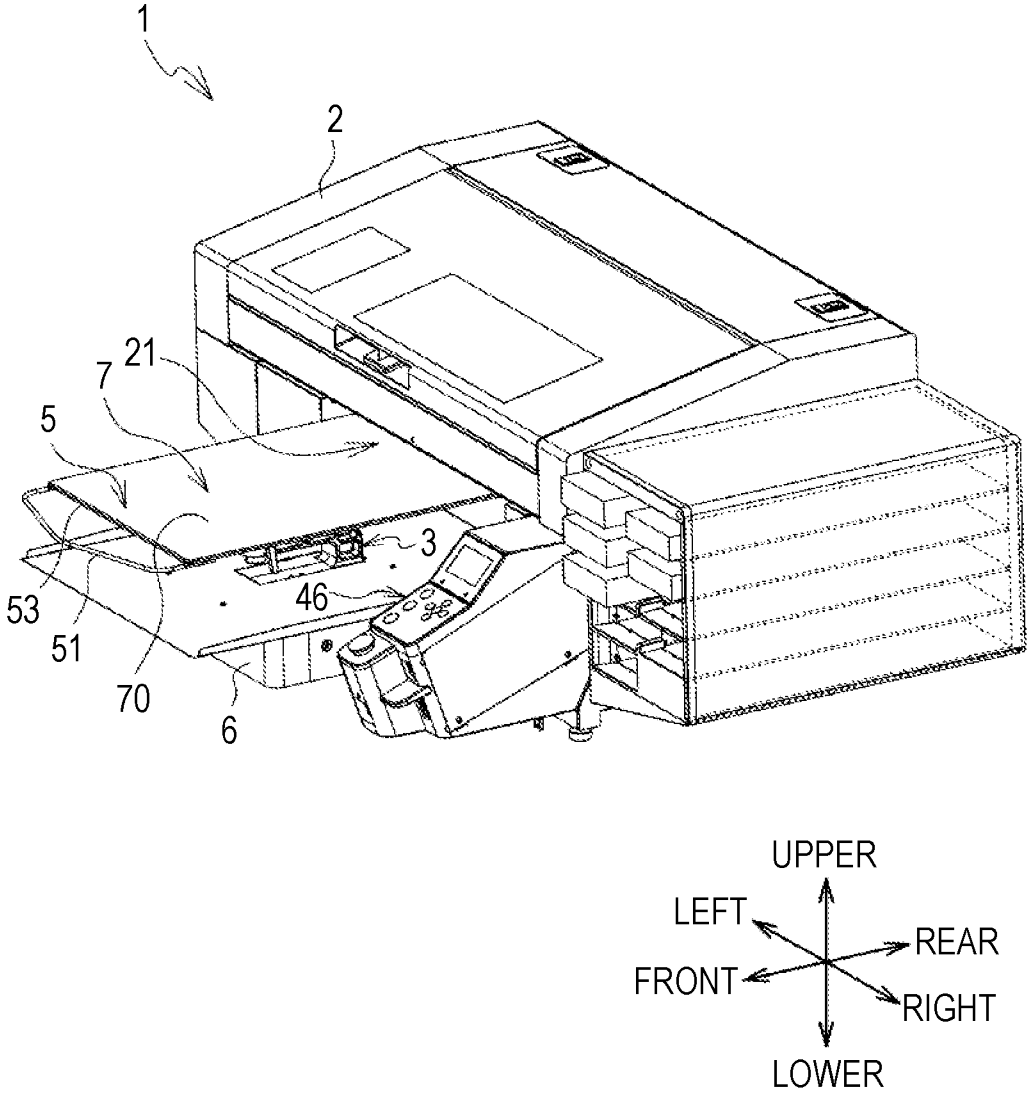
FIG. 1 is a perspective view of a printer 1 as viewed from a front upper right side.

A printer 1 and a platen 5 according to an embodiment of the present disclosure will be described with reference to the drawings. The printer 1 shown in FIG. 1 is an ink jet printer and performs printing by ejecting ink onto a cloth which is a print medium. The cloth is, for example, a fabric including cotton and silk, felt, or the like, and is a T-shirt 90 in the present embodiment. An upper side, a lower side, a lower left side, an upper right side, a lower right side, and an upper left side in FIG. 1 correspond to an upper side, a lower side, a front side, a rear side, a right side, and a left side of the printer 1 and the platen 5, respectively. In the present embodiment, mechanical elements in the drawings represent actual scales.

A schematic configuration of the printer 1 will be described with reference to FIG. 1. As shown in FIG. 1, the printer 1 incudes a case 2, a conveying unit 6, a platen support member 3, and the platen 5. The case 2 has a rectangular parallelepiped shape. An opening portion 21 is formed in the case 2. The opening portion 21 extends from a front surface to a rear surface of the case 2. An input unit 46 is provided on a right side of the opening portion 21 in the front surface of the case 2. A user inputs various types of information to the printer 1 by operating the input unit 46.

The conveying unit 6 is provided below the opening portion 21, and conveys the platen support member 3 in a front-rear direction. Specifically, the conveying unit 6 includes a pair of rails 12 shown in FIG. 2. The pair of rails 12 are arrange in a left-right direction and extend in the front-rear direction. The platen support member 3 is located above the conveying unit 6 and supported by the pair of rails 12. A sub-scanning motor (not shown) is provided below the platen support member 3. The platen support member3 can be moved in the front-rear direction along the pair of rails 12 by driving the sub-scanning motor.

The platen 5 is disposed inside the opening portion 21 in a front view. The platen 5 is supported by the platen support member 3 and moves in the front-rear direction between a printing position and an attachment/detachment position together with the platen support member 3. That is, the front-rear direction of the printer 1 is a sub-scanning direction. The printing position is a position at which the platen 5 faces heads 100 and 200 inside the case 2, which are to be described later. The attachment/detachment position is on a front side of the printing position, and is shown in FIG. 1. When the platen 5 is at the attachment/detachment position, the platen support member 3 and the platen 5 reach front end portions of the pair of rails 12, and the platen support member 3 is disposed outside the case 2. Details of a structure of the platen 5 will be described later. As an example of the cloth, the T-shirt 90 is placed on an upper surface of the platen 5.

Figure 2:
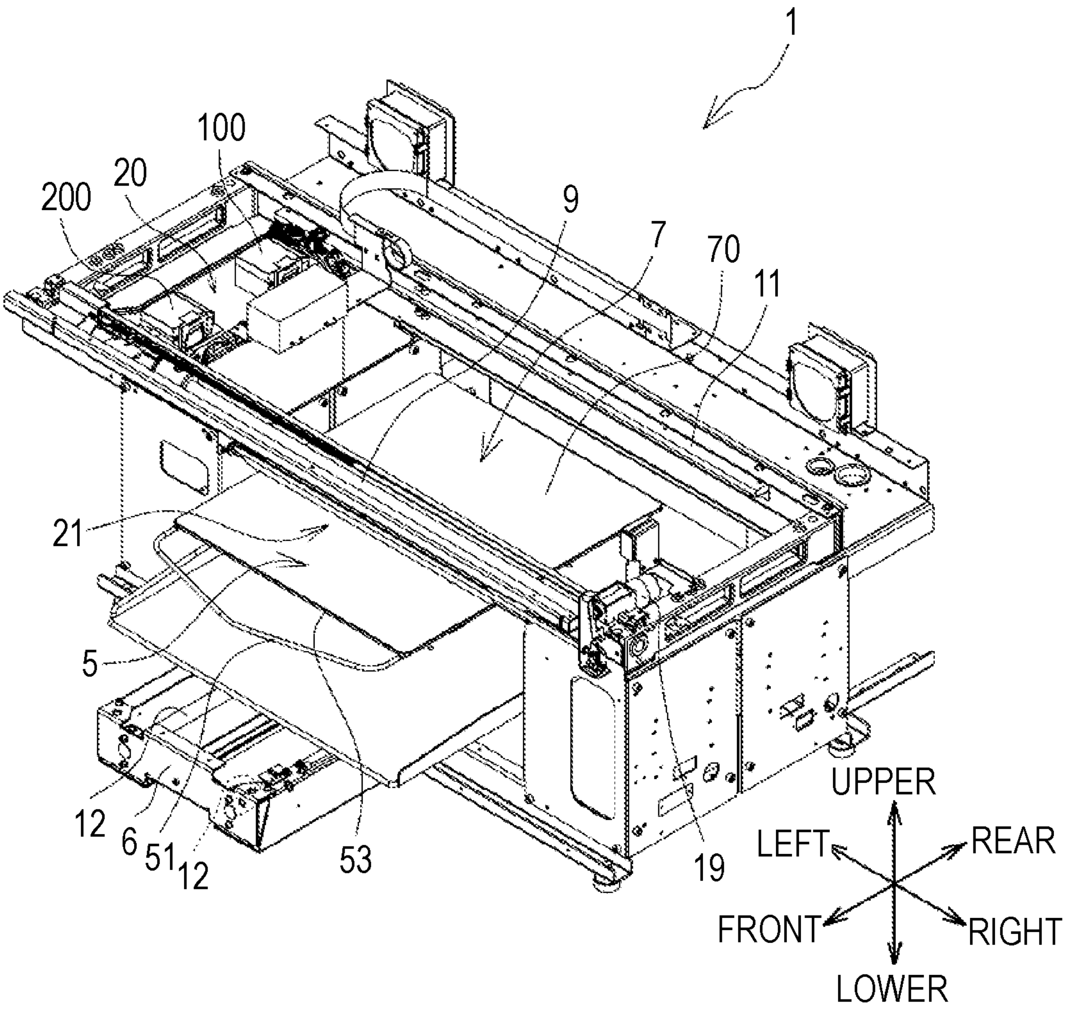
FIG. 2 is a perspective view of the printer 1 from which an upper portion of a case 2 is removed, as viewed from a front upper right.

As shown in FIG. 2, the printer 1 includes, inside the case 2 shown in FIG. 1, a rail 11, a guide shaft 9, a carriage 20, and the heads 100 and 200. The rail 11 is provided in an upper rear portion of the printer 1 and extends in the left-right direction. The guide shaft 9 is provided in front of the rail 11 and extends in the left-right direction. The carriage 20 is located between the rail 11 and the guide shaft 9 in the front-rear direction, and is supported by the rail 11 and the guide shaft 9. A main scanning motor 19 is provided on a right side of a right end portion of the guide shaft 9. The carriage 20 can move in the left-right direction along the rail 11 and the guide shaft 9 when driven by the main scanning motor 19.

The heads 100 and 200 are arranged in the front-rear direction and mounted on the carriage 20, and move in the left-right direction together with the carriage 20. The head 100 is located rearward than the head 200. Each of the heads 100 and 200 includes a nozzle (not shown) at a lower portion thereof, and ejects ink downward from the nozzle.

The printer 1 can print a color image on the print medium using ink of five colors including white, black, yellow, cyan, and magenta. Hereinafter, among the ink of five colors, the ink of a white color is referred to as white ink, and the ink of four colors including black, cyan, yellow, and magenta are collectively referred to as color ink. When the white ink and the color ink are collectively referred to, or when either one is not specified, the white ink and the color ink are simply referred to as ink. The white ink is used in printing as a portion representing a white color on the image or as a base of the ink of other colors. The color ink is ejected onto a base made of the white ink and used in printing of the color image.

The head 100 ejects the white ink from the nozzle thereof. The head 200 ejects the color ink from the nozzle thereof.

Figure 3:
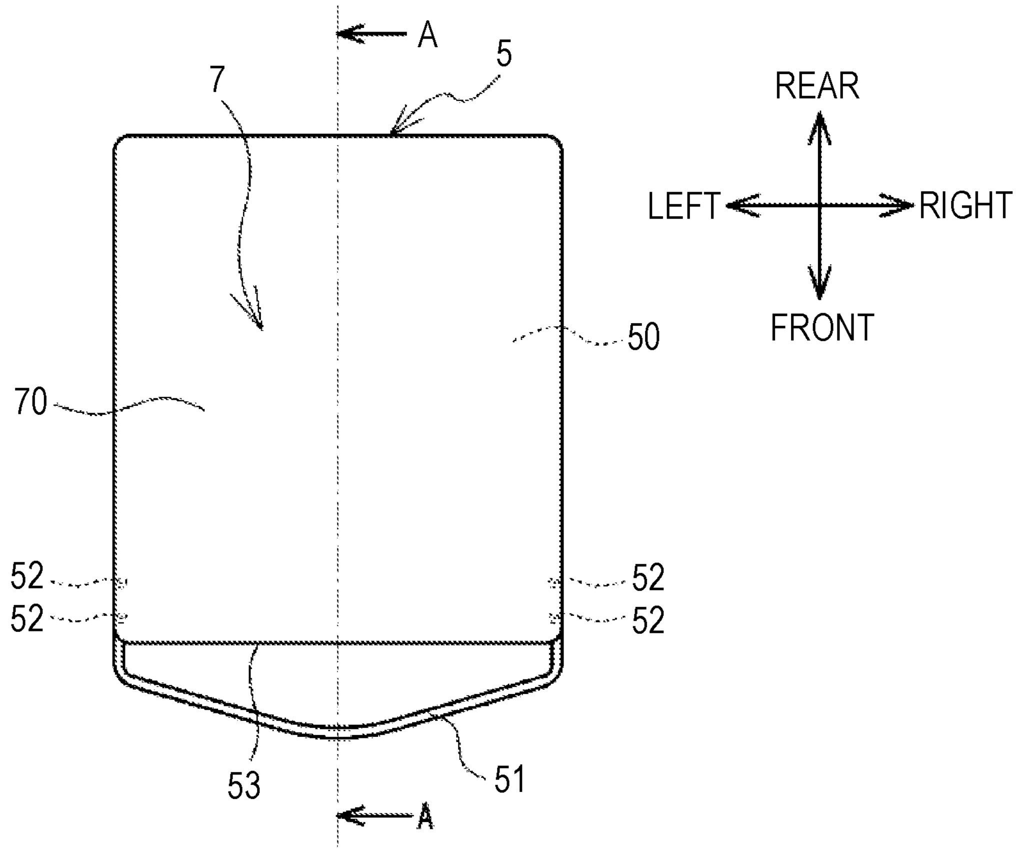
FIG. 3 is a plan view of a platen 5.

An example of a detailed structure of the platen 5 will be described with reference to FIGS. 3 and 4. The platen 5 includes a plate 50, a bonding material 8, and a sheet 7. The plate 50 extends in the front-rear direction and the left-right direction, has a rectangular shape elongated in the front-rear direction in a plan view, and is made of, for example, metal. On an upper surface of the plate 50, the bonding material 8 and the sheet 7 are stacked in order from below. The bonding material 8 is, for example, a double-sided tape, and fixes the plate 50 and the sheet 7. As shown in FIG. 3, the sheet 7 covers the entire upper surface of the plate 50 in a plan view. Accordingly, the platen 5 has the same shape as the plate 50 in a plan view, and has a rectangular shape in which a longitudinal direction is the front-rear direction and a lateral direction is the left-right direction in a plan view.

Figure 4:
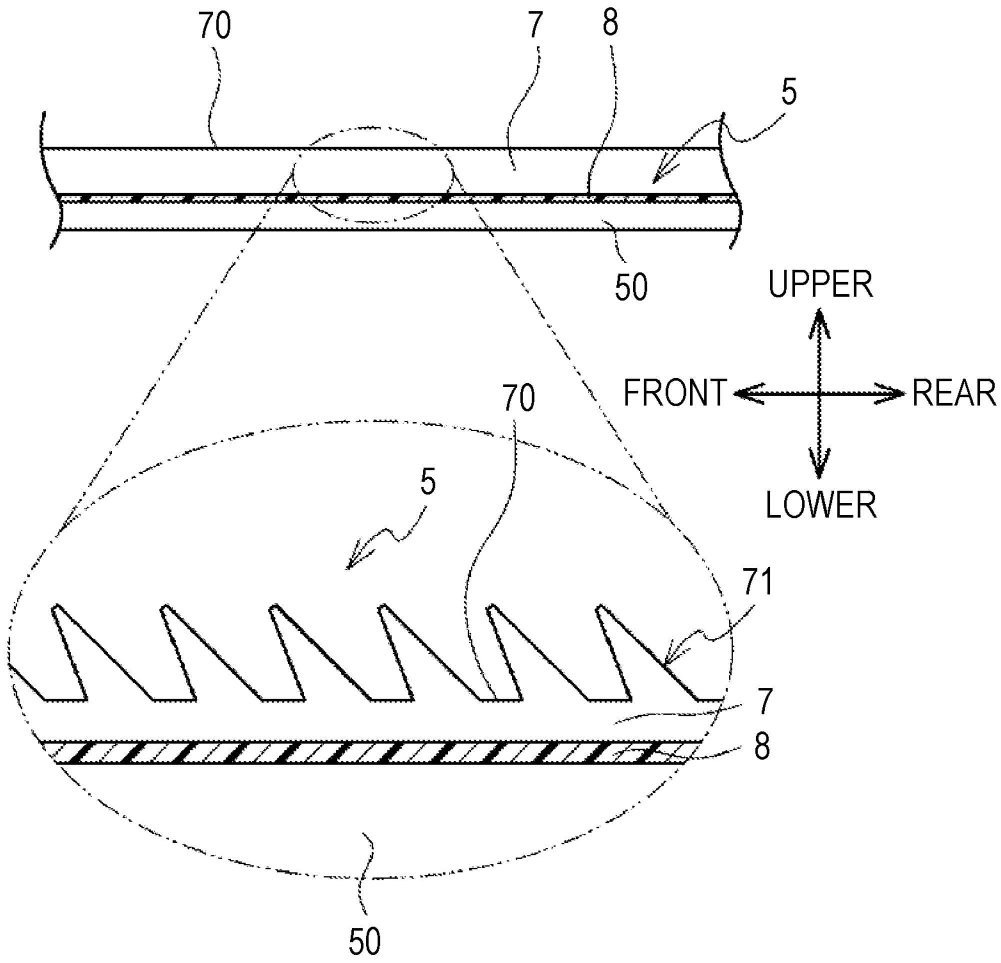
FIG. 4 is a cross-sectional view of the platen 5 shown in FIG. 3 taken along a line A-A.
Figure 6:
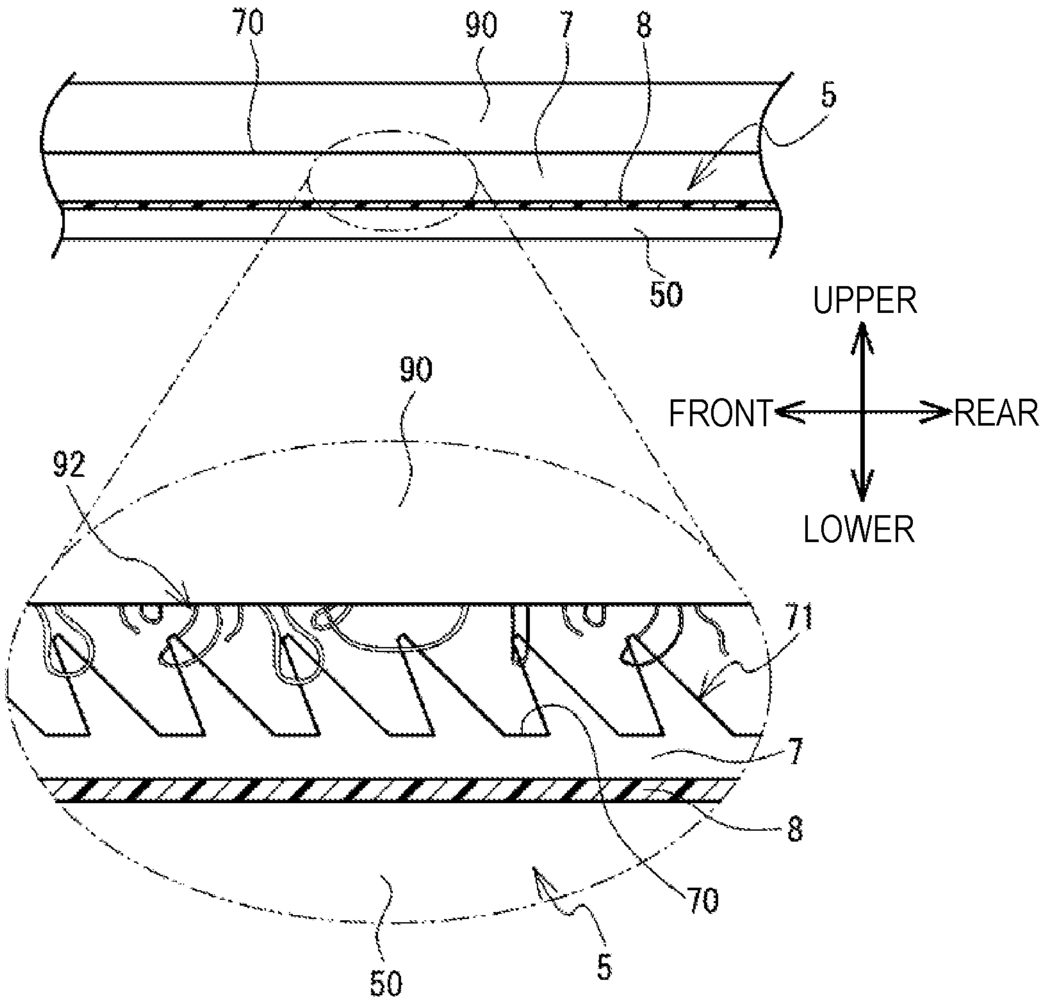
FIG. 6 is a cross-sectional view of the platen 5 and the T-shirt 90 shown in FIG. 5 taken along a line B-B.

As shown in FIG. 4, a plurality of protrusion portions 71 are arranged at predetermined intervals on an entire of an upper surface 70 of the sheet 7. For example, the protrusion portion 71 protrudes upward and forward from the upper surface 70 of the sheet 7. The plurality of protrusion portions 71 are, for example, a member of a hook-and-loop fastener on a side raised in a hook shape. The protrusion portion 71 tapers from a base portion thereof toward a tip end thereof. A height of the protrusion portion 71 is, for example, 1.7 mm. Each of the protrusion portions 71 tapers from a base portion thereof toward a tip end thereof. As shown in FIG. 6, the tip ends hook fibers 92 of the T-shirt 90 which is set on the platen 5. Further, since the protrusion portions 71 protrude upward and forward from the upper surface 70 of the sheet 7, when the T-shirt 90 is pulled forward and removed from the platen 5, hooking between the T-shirt 90 to be removed and the protrusion portions 71 is reduced.

As shown in FIG. 3, a positioning portion 51 is provided at a front end portion 53 of the platen 5. The positioning portion 51 is a rod-shaped member extending forward from both left and right sides toward a center in a plan view. A rear end portion of the positioning portion 51 is fastened to the plate 50 by fastening members (not shown) via a plurality of holes 52 penetrating a right front portion and a left front portion of the plate 50 in an upper-lower direction.

An outline of printing performed by the printer 1 will be described with reference to FIGS. 1, 2, 5 and 6. First, the user operates the input unit 46 to move the platen 5 to the attachment/detachment position shown in FIG. 1. The user holds a hem of the T-shirt 90 with a collar 91 of the T-shirt 90 facing forward and a body length being in the front-rear direction, and moves the T-shirt 90 backward so as to cover the platen 5 from a hem side. At this time, the T-shirt 90 is moved in a state of being separated upward from the sheet 7.

As shown in FIG. 5, the collar 91 comes into contact with the positioning portion 51, and positioning of the T-shirt 90 with respect to the platen 5 is completed. The user places the T-shirt 90 on the sheet 7 to set the T-shirt 90 on the platen 5. At this time, as shown in FIG. 6, the tip ends of the protrusion portions 71 hook the fibers 92 of the T-shirt 90 set on the platen 5. The user operates the input unit 46 to move the platen 5 on which the T-shirt 90 is set from the attachment/detachment position to the printing position.

The printer 1 ejects white ink from the head 100 and color ink from the head 200 while causing the carriage 20 to scan in the left-right direction. When the ejection of ink in one scan is completed, the printer 1 moves the platen 5 forward and ejects ink from the heads 100 and 200 while causing the carriage 20 to scan in the left-right direction again. Since the head 100 is located rearward than the head 200, the color ink is ejected onto the white ink. That is, the white ink is used as a base of the color ink.

When the white ink ejected from the head 100 adheres to the T-shirt 90 as a base, the white ink may cause the T-shirt 90 to shrink. When the T-shirt 90 shrinks, there is a possibility that a position on the T-shirt 90 at which the color ink ejected thereafter adheres deviates from a position on the T-shirt 90 at which the white ink adheres. Since the tip ends of the protrusion portions 71 of the platen 5 hook the fibers 92 of the T-shirt 90, an amount of shrinkage of the T-shirt 90 due to the white ink is reduced. Accordingly, a possibility that the position on the T-shirt at which the color ink adheres deviates from the position on the T-shirt 90 at which the white ink adheres is reduced, and a desired print result is obtained.

When the printing on the T-shirt 90 is completed, the printer 1 moves the platen 5 to the attachment/detachment position shown in FIG. 1. The user holds the collar 91 and pulls the T-shirt 90 forward to remove the T-shirt 90 from the platen 5. At this time, the T-shirt 90 slides on the sheet 7. Since each of the protrusion portions 71 protrudes upward and forward from the upper surface 70 of the sheet 7, the T-shirt 90 sliding on the sheet 7 can be removed from the platen 5 without being hooked by the protrusion portions 71.

As described above, the platen 5 includes the plate 50, the bonding material 8, and the sheet 7. On the upper surface of the plate 50, the bonding material 8 and the sheet 7 are stacked in order from below. The sheet 7 includes the plurality of protrusion portions 71 arranged at predetermined intervals. Each of the protrusion portions 71 protrudes upward and forward from the upper surface 70 of the sheet 7. As shown in FIG. 6, the tip ends of the protrusion portions 71 hook the fibers 92 of the T-shirt 90 set on the platen 5. As a result, the amount of shrinkage of the T-shirt 90 due to the ink adhesion is reduced. Accordingly, the platen 5 can reduce the possibility that the position on the T-shirt 90 at which the ejected ink adheres deviates from a desired position on the T-shirt 90.

The plurality of protrusion portions 71 are arranged at predetermined intervals on the entire upper surface 70 of the sheet 7. In this case, the amount of shrinkage of the T-shirt 90 due to the ink adhesion can be reduced as compared with a case where the protrusion portions 71 are provided on a part of the upper surface 70 of the sheet 7 of the platen 5.

The platen 5 extends in the front-rear direction and the left-right direction, and each of the protrusion portions 71 protrudes upward and forward from the upper surface 70 of the sheet 7. When the user pulls the T-shirt 90 forward to remove the T-shirt 90 from the platen 5, the hooking between the T-shirt 90 to be removed and the protrusion portions 71 is reduced.

The positioning portion 51 that positions the collar 91 of the T-shirt 90 is provided at the front end portion 53 of the platen 5. Each of the protrusion portions 71 protrudes upward and forward. That is, the protrusion portions 71 protrudes toward the front end portion 53 of the platen 5. Thus, when the user holds the collar 91 and pulls the T-shirt 90 forward at the time of removing the T-shirt 90 from the platen 5, the hooking between the T-shirt 90 to be removed and the protrusion portions 71 is reduced.

The printer 1 includes the heads 100 and 200 that eject the ink onto the T-shirt 90 and the platen 5 that supports the T-shirt 90. Since the tip ends of the protrusion portions 71 of the platen 5 hook the fibers 92 of the T-shirt 90, the amount of shrinkage of the T-shirt 90 due to the ink adhesion is reduced. Accordingly, the printer 1 can reduced the possibility that the position on the T-shirt 90 at which the ejected ink adheres deviates from the desired position on the T-shirt 90.

The printer 1 includes the head 100 for ejecting the white ink used in printing as a base, and the head 200 for ejecting the color ink on the white ink. In the printer 1, the amount of shrinkage of the T-shirt 90 due to the white ink is reduced, so that a possibility that the position on the T-shirt 90 at which the ejected color ink adheres deviates from a position on the cloth at which the white ink adheres can be reduced.

In the above embodiment, the heads 100 and 200 correspond to an "ink jet head" of the present disclosure. The T-shirt 90 corresponds to a "cloth" or "clothing" of the present disclosure. The printer 1 corresponds to a "printing device" of the present disclosure. The white ink corresponds to a "base ink" of the present disclosure. The head 100 corresponds to a "base ink jet head" of the present disclosure. The head 200 corresponds to a "color ink jet head" of the present disclosure. The plate 50 extends in a first direction and a second direction. An example of the first direction is the front-rear direction, and an example of the second direction is the left-right direction. The T-shirt 90 is pulled forward and removed from the platen 5. An example of the removal direction is the forward direction. The upper surface 70 of the sheet 7 is an example of an "upper surface" of the present disclosure. The front end portion 53 of the platen 5 is an example of a "one end portion" of the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

The present disclosure can be variously modified from the above embodiment. Various modifications to be described below can be combined as long as no contradiction occurs. For example, the present disclosure can be applied to a printer of a type different from the ink jet type in the above embodiment.

In the above embodiment, the T-shirt 90 is exemplified as the cloth, but the present disclosure is not limited thereto.

The cloth may be, for example, various shirts such as a dress shirt; pants; skirts; handkerchiefs; or a textile itself. The cloth is not limited to a fabric including cotton and silk, and may be non-woven cloth such as felt. The tip ends of the protrusion portions 71 are not limited to being hooked with fibers of the cloth, and may be hooked with fluff of the cloth. Even when the printing is performed on the non-woven cloth, an amount of shrinkage of the non-woven cloth due to the ink adhesion is reduced by the tip ends of the protrusion portions 71. Accordingly, the platen 5 can reduce a possibility that a position on the non-woven cloth at which the ejected ink adheres deviates from a desired position on the non-woven cloth.

Figure 7A:
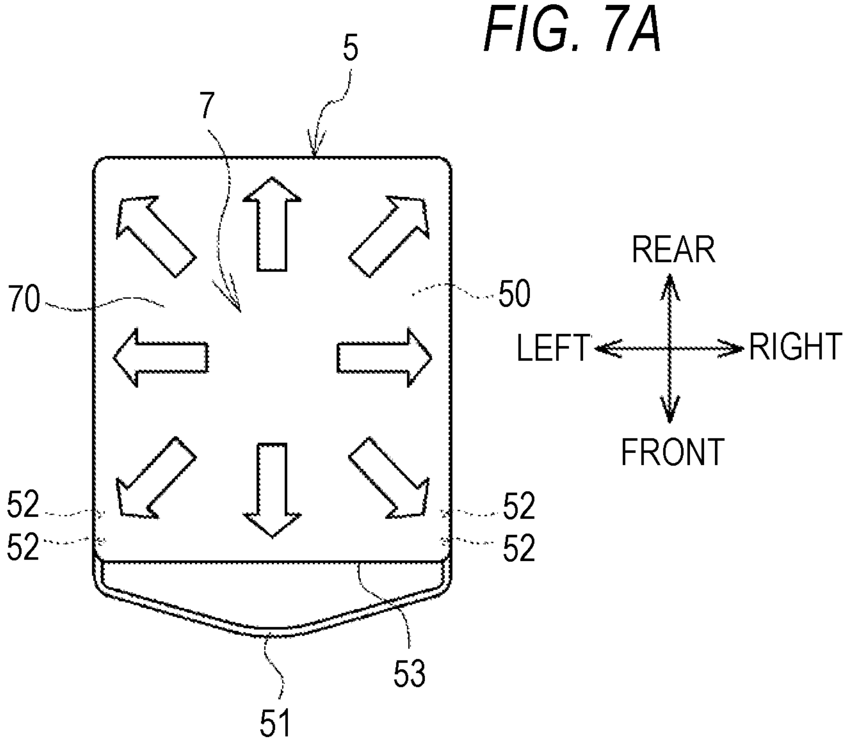
FIGS. 7A and 7B are diagrams illustrating modifications of directivity of protrusion portions 71 in a horizontal direction.

In the above embodiment, the protrusion portions 71 protrude upward and forward from the upper surface of the platen 5, but the direction in which the protrusion portions 71 protrude is not limited thereto. For example, as shown in FIG. 7A, the protrusion portions 71 protrude upward. The protrusion portions 71 may further protrude outward in a radial manner in the front-rear direction and the left-right direction from the center of the platen 5. On the T-shirt 90 set on the platen 5, an image is often printed at a position corresponding to the center of the upper surface of the platen 5, and the T-shirt 90 tends to shrink toward an inside of the platen 5 in the front-rear direction and the left-right direction due to the ink. Since the protrusion portions 71 protrude in the above-described directions, the tip ends of the protrusion portions 71 easily hook the fluff or fibers of the cloth. Therefore, the platen 5 can reduce an amount of shrinkage of the T-shirt 90 that tends to shrink inward.

Figure 7B:
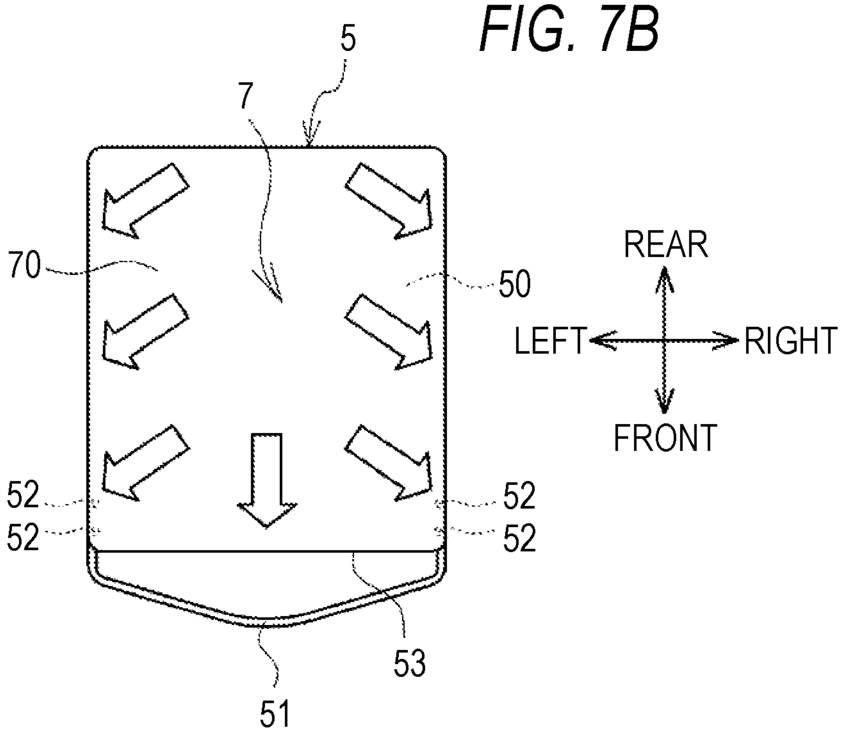

Further, as shown in FIG. 7B, the protrusion portions 71 may protrude in a radial manner from a central portion in the left-right direction of a rear end portion of the platen 5 instead of protruding from the center of the platen 5. In this case, the platen 5 can reduce an amount of shrinkage of the T-shirt 90 that tends to shrink inward, and reduce the hooking between the T-shirt 90 to be pulled forward and removed, and the protrusion portions 71.

The shape of the protrusion portion may be changed as appropriate. The shape of the protrusion portion may be any shape as long as the tip end hooks the fluff or fibers of the cloth. A shape in which the tip end of the protrusion portion hooks the fluff or fibers of the cloth is, for example, a shape in which the tip end of the protrusion portion protrudes toward at least one of the front side, the rear side, the left side and the right side with respect to the base portion. It is desirable that the protrusion portion has a hook shape that extends upward from the base portion and protrudes toward at least one of the front side, the rear side, the left side and the right side therefrom, or a shape having a corner without a curved tip end. A member having such a shape is provided, for example, on a member of a hook-and-loop fastener on a side raised in a hook shape. Further, the protrusion portions may be a fibrous material or a raised material, such as those found in clothing or a brush for a vacuum cleaner. The fibrous material as the protrusion portions may protrude upward from the upper surface 70 of the sheet 7 by several millimeters. It is desirable that the protrusion portions protrude upward and toward at least one of the front side, the rear side, the left side and the right side, and it is preferable that the protrusion portions protrude toward the front side among the directions which is a direction in which the T-shirt 90 is to be removed.

As shown in FIG. 8, each of protrusion portions 72 which is a first modification of the protrusion portion has an inverted J-shape, and has a shape in which the protrusion portion 72 extends upward while being tapered from a base portion thereof toward a tip end thereof in a right side view, and then extends forward while being curved. Since the protrusion portions 72 firmly hold the fluff or fibers of the cloth hooked, an amount of shrinkage of the cloth due to the ink is also reduced in the first modification.

Further, each of protrusion portions 73 which is a second modification of the protrusion portion has a so-called mushroom shape which is a hook-and-loop fastener. After extending upward from the base portion, an upper end portion protrudes forward and rearward as shown in FIG. 9, and also protrudes leftward and rightward in the same way as forward and backward, although not shown. The protrusion portion 73 has no directivity in the front-rear direction and the left-right direction. Similar to the protrusion portions 72, the protrusion portions 73 firmly hold the fluff or fibers of the cloth hooked, so that an amount of shrinkage of the cloth due to the ink is also reduced in the second modification. The protrusion portions 73 may protrude toward any of the front side, rear side, left side and the right side.

Further, as shown in FIG. 10, each of protrusion portions 74 which is a third modification of the protrusion portion has an inverted trapezoidal shape in which a tip end is wider than a base portion in a right side view. Since the protrusion portions 74 can hook the fluff or fibers of the cloth with a simple structure, an amount of shrinkage of the cloth due to the ink is also reduced in the third modification.

As shown in FIGS. 11 and 12, each of protrusion portions 75 which is a fourth modification of the protrusion portion has a needle shape extending in the upper-lower direction. A plurality of grooves 76 which are recessed downward from an upper surface 54 of the plate 50 and extend in the front-rear direction and the left-right direction are provided on the platen 5. The protrusion portion 75 is provided at an intersection of the groove 76 extending in the front-rear direction and the groove 76 extending in the left-right direction. A tip end of the protrusion portion 75 protrudes upward from the upper surface 54 of the plate 50. The tip ends of the protrusion portions 75 pierce and hook the cloth placed on the platen 5. Therefore, in the fourth modification, an amount of shrinkage of the cloth due to the ink is also reduced. In the fourth modification, the upper surface 54 of the plate 50 is an example of an "upper surface" of the present disclosure.

The shape of the protrusion portion may be any shape as long as the tip end hooks the fluff or fibers of the cloth as in the above modification. The sheet 7 may be provided with a combination of protrusion portions of different shapes. For example, the sheet 7 may be provided with the protrusion portions 71 and the protrusion portions 73 that are alternately arranged in the left-right direction.

The protrusion portions 71 to 75 may be provided on only a part of the upper surface of the platen 5. For example, the protrusion portions 71 to 75 may be provided only on the upper surface of the platen 5 corresponding to a position on the T-shirt 90 (for example, a center portion of the T-shirt 90) at which printing is often performed.

In the above embodiment, the shapes of the platen 5 and the plate 50 both are a rectangular shape in which the longitudinal direction is the front-rear direction and the lateral direction is the left-right direction in a plan view, but the present disclosure is not limited thereto. The shapes of the platen 5 and the plate 50 may both be a rectangular shape in which the longitudinal direction is the left-right direction and the lateral direction is the front-rear direction in a plan view, or a square shape. In a case where the T-shirt 90 is removed in the left direction or the right direction, or in a case where the positioning portion 51 is provided at a right end portion or a left end portion of the platen 5, an example of the first direction is the left-right direction, and an example of the second direction is the front-rear direction.

In the above embodiment, the double-sided tape is exemplified as the bonding material 8, but the present disclosure is not limited thereto. For example, an adhesive such as glue may be used. Further, the plate 50 and the sheet 7 may be fixed by a method other than the bonding material 8. For example, the sheet 7 may be fixed by sandwiching the sheet 7 between the plate 50 and a frame portion covering an edge portion of the upper surface of the plate 50. Further, the sheet 7 may be fixed to the upper surface of the plate 50 by both the bonding material 8 and the frame portion.

A configuration of the positioning portion 51 may be appropriately changed. For example, a marker for positioning the collar 91 of the T-shirt 90 may be provided at the front end portion of the upper surface of the plate 50, and the marker may be used as the positioning portion 51. Further, the positioning portion 51 may not be provided on the platen 5.

For example, the printer 1 may be configured to move the platen 5 in a main scanning direction instead of moving the heads 100 and 200. That is, it is sufficient that the printer 1 moves the heads 100 and 200 and the platen 5 relative to each other.

It is sufficient that at least one of the heads 100 and 200 is mounted on the carriage 20. For example, only the head 200 may be mounted on the carriage 20. The ink ejected by the heads 100 and 200 may be changed as appropriate.

In the above embodiment, the platen 5 moves to the attachment/detachment position and the printing position in the front-rear direction, but the position to which the platen 5 moves is not limited thereto. For example, the platen 5 may move to a loading position, the printing position, and a removal position. The loading position is the same as the attachment/detachment position shown in FIG. 1. The removal position is a position rearward than the printing position. When the platen 5 is at the removal position, the platen support member 3 and the platen 5 reach rear end portions of the pair of rails 12.

The user sets the cloth on the platen 5 at the loading position. The printer 1 moves the platen 5 to the printing position and performs printing on the cloth. When the printing is completed, the printer 1 moves the platen 5 to the removal position. The user pulls the cloth rearward and removes the cloth from the platen 5. In the modification, since the cloth is pulled rearward and removed from the platen 5, it is desirable that the protrusion portions 71 protrude upward and rearward from the upper surface of the platen 5.

The platen 5 may include a frame 5Fa. As shown in FIG. 13, the frame 5Fa surrounds the plate 50 of the platen 5 from outside in the front-rear direction and the left-right direction. An upper portion of the frame 5Fa extends inward in the front-rear direction and the left-right direction and is in contact with the upper surface 70 of the platen 5. Thus, in a state where the cloth is set on the upper surface 70, as shown in FIG. 14, when the frame 5Fa is placed on the plate 50 from above, the frame 5Fa fixes the cloth on the upper surface 70. As a result, since the cloth set on the platen 5 is hooked by the tip ends of the protrusion portions 71 to 75 and is sandwiched by the frame 5Fa, an amount of shrinkage of the cloth due to the ink adhesion is reduced. Therefore, the platen 5 can reduce the possibility that a position on the cloth at which the ejected ink adheres deviates from a desired position on the cloth.

In FIGS. 13 and 14, the frame 5Fa is not connected to the plate 50 of the platen 50, but may be connected thereto. As shown in FIG. 15, a frame 5Fb is connected to the plate 50 via a connection portion 5C such as a hinge provided at the rear end of the plate 50. Accordingly, as shown in FIG. 16, the frame 5Fb can be pivoted upward from a position, at which a front end of the frame 5Fb is in contact the plate 50, around the connection portion 5C. Since the frame 5Fb and the plate 50 are connected, alignment between the frame 5Fb and the plate 50 is facilitated. In FIGS. 13 to 16, the bonding material 8 and the sheet 7 are not shown.

What is claimed is:

1. A platen configured to support a cloth onto which ink is to be ejected from an ink jet head, the platen comprising:
- a plurality of protrusion portions,
- wherein the platen comprises a plate, and extends in a first direction orthogonal to an upper-lower direction and in a second direction orthogonal to the upper-lower direction and the first direction,
- tip ends of the protrusion portions each have a shape for hooking fluff or fibers of the cloth, and
- the plurality of protrusion portions each protrude upward and toward one end portion of the platen in the first direction from an upper surface of the platen.

2. The platen according to claim 1,
- wherein the platen supports clothing as the cloth,
- a positioning portion configured to position a collar of the clothing is provided at the one end portion of the platen in the first direction.

3. The platen according to claim 1,
- wherein the plurality of protrusion portions are provided on an entire of the upper surface.

4. A printing device comprising:
- an ink jet head configured to eject ink onto a cloth; and
- a platen configured to support the cloth,
- wherein the platen includes a plurality of protrusion portions,
- the platen comprises a plate, and extends in a first direction orthogonal to an upper-lower direction and in a second direction orthogonal to the upper-lower direction and the first direction,
- tip ends of the protrusion portions each have a shape for hooking fluff or fibers of the cloth, and
- the plurality of protrusion portions each protrude upward and toward one end portion of the platen in the first direction from an upper surface of the platen.

5. The printing device according to claim 4,
- wherein the ink jet head includes:
  - a base ink jet head configured to eject base ink; and
  - a color ink jet head configured to eject color ink onto the base ink which is adhered onto the cloth.

* * * * *